United States Patent [19]
Rossitto

[11] 3,740,086
[45] June 19, 1973

[54] ANIMAL EXCRETA PICKUP DEVICE
[75] Inventor: Charles C. Rossitto, Bronx, N.Y.
[73] Assignee: Liotta Sebastian, White Plains, N.Y.; a part interest
[22] Filed: July 26, 1971
[21] Appl. No.: 166,031

[52] U.S. Cl. .............................. 294/19 R, 294/1 R
[51] Int. Cl. ............................................. A47f 13/06
[58] Field of Search............. 294/1 R, 19 R, 19 A, 294/49, 50.5, 50.6, 50.7, 50.8, 50.9; 56/400.11, 400.12; 73/425.2, 425.4

[56] References Cited
UNITED STATES PATENTS
3,444,938   5/1969   Ballmann...................... 294/50.5 X Primary Examiner—Evon C. Blunk
Assistant Examiner—Johnny D. Cherry
Attorney—Curtis, Morris & Safford

[57] ABSTRACT

A device for picking up and disposing of animal fecal excreta is disclosed which includes a handle having a disposable container mounted at one end thereof. The container has a cavity opening outwardly of said handle and at least one rib within the cavity. Animal excreta is picked up by pressing the open end of the container against the excreta whereby the excreta engages with the wall and rib of the container cavity. Following pickup, the open end of the container is closed by pressing the container against a snap-on cover. Thereafter, the closed container is disengaged from the handle by sliding a collar, slidably mounted on the handle, against the container to force it from the end of the handle.

7 Claims, 6 Drawing Figures

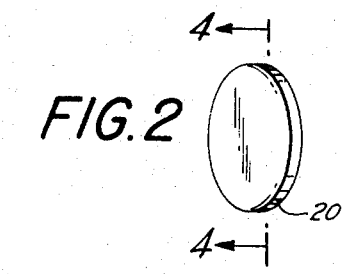
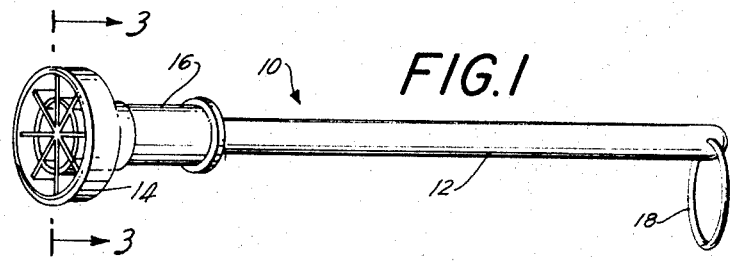
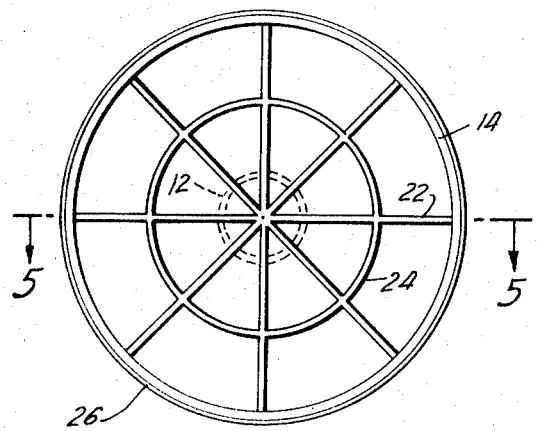
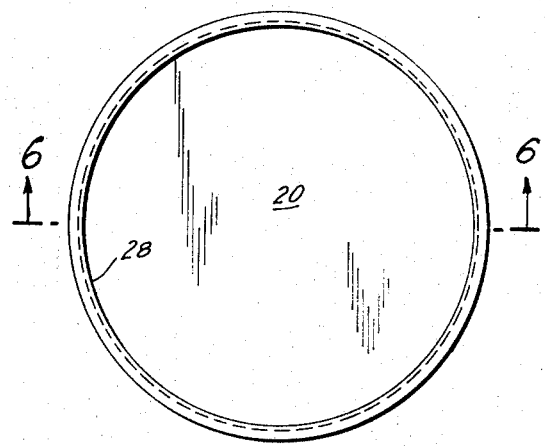
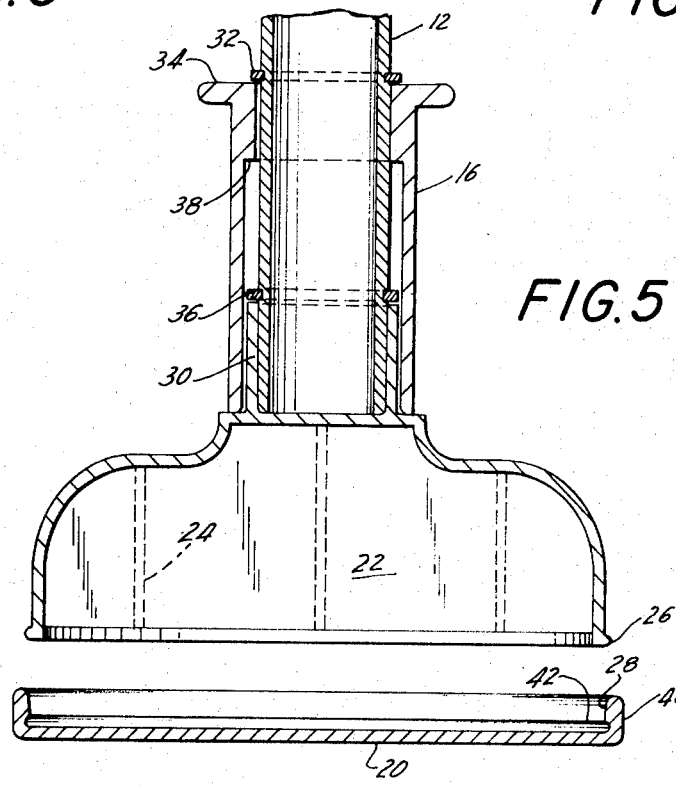
INVENTOR.
CHARLES C. ROSSITTO

ANIMAL EXCRETA PICKUP DEVICE

This invention relates to animal excreta pickup devices and, in particular, to an animal excreta pickup device having a disposable container with internal ribs which engage animal fecal excreta.

A serious problem now facing many major cities involves persuading pet owners to clean up the fecal matter excreted by their pets. Not only is the presence of such excreta aesthetically undesirable, but often it also creates a substantial health hazard. In an effort to eliminate such hazards, some cities have already passed ordinances that require pet owners to pickup and dispose of all fecal matter excreted by their pets. The primary method available for removal of excreta involves shoveling such excreta into bags for subsequent disposal. This method of removal is often troublesome since portions of the excreta usually adhere to the shovel blade thus requiring the additional procedure of cleaning the shovel following each use.

Although some prior devices have been proposed to solve the foregoing problem, these devices are either overly complex for the function performed or require a container removal procedure where an operator's hands may contact portions of excreta on the outside of the container.

Accordingly, it is an object of the present invention to pickup and dispose of animal fecal excreta in a neat and clean manner which substantially eliminates possible personal contact with the excreta. Another object of the invention is to contain animal excreta in a substantially airtight manner to prevent transference of undesirable odors after the excreta has been picked up.

In accordance with an aspect of the present invention, a handle is provided with a disposable container mounted at one end thereof. The container has a cavity opening outwardly of the handle and contains a rib pattern therein. The handle is utilized to force the open end of the container against animal fecal whereby the excreta is forced into engagement with the ribs and container wall. Following this pickup step, a snap-on cover is attached to the container by utilizing the handle to press the container against the cover thereby sealing the container. The handle with covered container attached can then be carried to a suitable receptacle where disengagement means on the handle can be used to remove the container from the handle.

The above, and other objects, features and advantages of this invention will be apparent in the following detailed description of an illustrative embodiment thereof which is to be read in connection with the accompanying drawings wherein:

FIG. 1 is a perspective view of an animal excreta pickup device according to an embodiment of the present invention;

FIG. 2 is a perspective view of a container cover for the device of FIG. 1;

FIG. 3 is an end view taken along the line 3—3 of FIG. 1;

FIG. 4 is an end view taken along the line 4—4 of FIG. 2;

FIG. 5 is a sectional side view taken along the line 5—5 of FIG. 3; and

FIG. 6 is a sectional side view taken along the line 6—6 of FIG. 4.

An animal excreta pickup device 10 is shown in FIG. 1, which has an elongated handle 12 of such length as to permit an adult to utilize the device from a standing position. An open ended disposable container 14 is mounted at one end of handle 12. Adjacent to container 14, a collar 16 is slidably mounted on handle 12 to provide means for disengaging container 14 from handle 12 following use of the device to pickup animal excreta. A strap 18 is mounted at the opposite end of the handle 12 from container 14, to aid in carrying the device. After animal excreta has been picked up by device 10, a snap-on cover 20, shown in FIG. 2, is utilized to seal the excreta within the container 14.

The end view of pickup device 10, shown in FIG. 3, illustrates one pattern of internal ribs which may be used to engage animal excreta. In this illustration eight straight ribs 22 are shown extending radially from the central axis to the wall of container 14. Each rib 22 is approximately bisected by a cylindrical rib 24 which is centered on the central axis of container 14. Ribs 22 and 24, along with the wall of container 14 form sixteen separate cavities within the container which ensure proper engagement between the container and any animal fecal excreta to be picked up.

Of course, different sizes, shapes and patterns of ribs also may be effectively utilized to provide the necessary engagement with the excreta.

FIG. 3 also shows an external annular bead 26 which extends around the lower end of the container wall. This bead engages an internal bead 28 on cover 20, as shown in FIG. 4, to enclose excreta within container 14.

The relationship between the container 14 and cover 20 is further shown in the schematic side views of FIGS. 5 and 6. The cover 20 has an annular vertical wall 40 which flexes as the internal bead 28 of cover 20 slides over bead 26 of container 14. When in position on container 14, bead 26 fits within an annular groove 42 formed in wall 40 between bead 28 and the remainder of the cover. Preferably, the seal between cover 20 and container 14 is airtight to prevent escape of odors from the contained excreta.

FIG. 5 also shows the disengagement assembly which is used to remove the disposable container 14 from the end of handle 12. As previously mentioned, collar 16 is slidably mounted on handle 12. Upward motion of collar 16 is limited by an annular upper stop 32 which is mounted on the handle to engage the upper surface 34 of collar 16. Downward movement of collar similarly is limited by an annular lower stop 36, mounted nearer the bottom of handle 12, which engages with an inner ledge 38 on collar 16.

A tubular upward extension 30 of container 14 is sized to provide a tight fit when slid onto the lower end of handle 12. When in use, the only force that is applied to the container is a downward force from handle 12, therefore, the engagement between container 14 and handle 12 is maintained until collar 16 is forced against the top of the container to drive the container from the end of the handle.

To utilize pickup device 10, a pet owner first inserts a new disposable container 14 on the end of his permanent handle 12. If he so desires, he may keep the cover 20 on the container until he is ready to use it. Then, as he walks his pet, he may utilize strap 18 as a shoulder strap, use the device as a walking stick or carry the device as he desires. After his pet has excreted fecal matter, he must first uncover the container, if covered, and by holding the handle, press the open end of the container against the excreta to engage with the ribs and wall of the container. When all of the excreta has been so picked up, he can lay the cover 20, annular wall side up, on the sidewalk, pavement or ground. Then by again holding the handle, he can press the container against the cover until the cover snaps onto the container. The pet owner may now carry the device back to his home without the discomfort caused by undesirable odors. After he has returned home, he can utilize the collar to disengage the closed container, from the handle, over a suitable waste receptacle. It should be noted that at no time does the pet owner have to touch the container or cover following exposure to the excreta.

In the present embodiment, all the components of the pickup device can be formed easily from molded materials such as plastics. However, it is also anticipated that the container and cover could be formed of cardboard or other suitable materials which are more easily destroyed than plastics.

It should be apparent that containers 14 can be manufactured in various sizes to accommodate the fecal excreta from different sized pets. Furthermore, the rib pattern may also be increased or decreased as required to meet particular needs.

Although an illustrative embodiment of the present invention has been described herein with reference to the accompanying drawings, it is to be understood that the invention is not limited to that precise embodiment, and that various changes and modifications may be effected therein by one skilled in the art without departing from the scope or spirit of this invention.

What is claimed is:

1. A device for picking up and disposing of animal fecal excreta and the like comprising in combination, a handle, a disposable container removably mounted at one end of said handle, said container having a cavity opening outwardly of said handle and a plurality of ribs in said cavity which form a plurality of compartments therein, whereby said container is adapted to surround animal fecal excreta and said ribs in said cavity are adapted to engage said excreta and maintain said excreta in said cavity; means for closing the open end of said cavity, and means for disengaging said disposable container from said handle.

2. A device as defined in claim 1 wherein said container is frictionally mounted on said handle.

3. A device as defined in claim 3 wherein said means for disengaging said container from said handle comprises a collar slidably mounted on said one end of said handle adjacent said container, said collar being engageable with said container thereby to move said container with respect to said handle and to disengage said container therefrom.

4. A device as defined in claim 3 including stop means on said handle for constraining the movement of said collar.

5. A device as defined in claim 1 wherein said means for closing the open end of said container comprises a cover engageable with said container.

6. A device as defined in claim 5 wherein said container includes an external annular raised bead formed on the periphery thereof and said cover has an internal annular recess formed therein, said annular bead and said annular recess being respectively located on said container and said cover to be located in overlapping relationship when said cover is placed on said container, whereby said bead is received in said recess and said cover is maintained on said container.

7. A device for picking up and disposing of animal fecal excreta and the like comprising in combination, an elongated handle, a slidably removable container frictionally mounted at one end of said handle, said container having a cavity opening outwardly of said handle, and a pattern of ribs within said cavity, a cover extending beyond the open end of said cavity and removably engageable with said container, and a collar slidably mounted on said handle and engageable with said container, said pattern of ribs including a plurality of ribs extending radially from the central axis of said container and an annular continuous rib connected between each of said plurality of radially extending ribs.

* * * * *

UNITED STATES PATENT OFFICE
CERTIFICATE OF CORRECTION

Patent No. 3,740,086　　　　　　　　Dated June 19, 1973

Inventor(s) Charles C. Rossitto

It is certified that error appears in the above-identified patent and that said Letters Patent are hereby corrected as shown below:

Column 4, line 6, (Claim 3) "3" (second occurrence) should be --2--.

Signed and sealed this 20th day of November 1973.

(SEAL)
Attest:

EDWARD M. FLETCHER, JR.　　　　　　RENE D. TEGTMEYER
Attesting Officer　　　　　　　　　　Acting Commissioner of Patents